United States Patent [19]

Deets et al.

[11] 4,017,559

[45] Apr. 12, 1977

[54] POLYBLEND CONTAINING TWO GRAFTED RUBBER COMPONENTS

[75] Inventors: Gary L. Deets; Robert L. Kruse, both of Springfield, Mass.

[73] Assignee: Monsanto Company, St. Louis, Mo.

[22] Filed: July 1, 1975

[21] Appl. No.: 592,282

Related U.S. Application Data

[63] Continuation-in-part of Ser. No. 291,949, Sept. 25, 1972, which is a continuation-in-part of Ser. No. 220,428, Jan. 24, 1972, abandoned.

[52] U.S. Cl. .................. 260/876 R; 260/42.44; 260/42.47; 260/45.75 D; 260/45.75 B
[51] Int. Cl.² .................. C08L 55/02; C08L 57/08
[58] Field of Search ..... 260/890, 45.75 B, 45.75 D, 260/876 R, 42.47, 42.44

[56] References Cited

UNITED STATES PATENTS

| | | | |
|---|---|---|---|
| 2,802,808 | 8/1957 | Hayes | 260/876 R |
| 2,842,518 | 7/1958 | Irving | 260/879 |
| 2,991,270 | 7/1961 | Roper | 260/45.75 B |
| 3,333,970 | 8/1967 | Green | 260/45.75 B |
| 3,509,237 | 4/1970 | Aubrey et al. | 260/880 R |

*Primary Examiner*—J. Ziegler
*Attorney, Agent, or Firm*—William J. Farrington; Edward P. Grattan; James C. Logomasini

[57] ABSTRACT

This invention relates to a polyblend composition and a method for preparing same, said composition comprising a copolymer of a monovinylidene aromatic monomer such as styrene and an unsaturated nitrile monomer such as acrylonitrile blended with a grafted chloroprene rubber, a grafted polybutadiene rubber and a metal oxide.

8 Claims, No Drawings

POLYBLEND CONTAINING TWO GRAFTED RUBBER COMPONENTS

This application is a continuation-in-part of copending application Ser. No. 291,949, filed Sept. 25, 1972, which, in turn, is a continuation-in-part of Ser. No. 220,428, filed Jan. 24, 1972 and now abandoned.

BACKGROUND OF THE INVENTION

Rubber modified polymers prepared from monovinylidene aromatic monomers such as styrene and unsaturated nitrile polymers such as acrylonitrile have gained commercial utility as tough engineering plastics. Such plastics find widespread use in household appliances, automotive and architectural applications.

Government codes are requiring that polymers for the above applications have improved flame-retardant properties. The methods used to achieve the desired levels of fire retardancy has, in many cases, caused a deterioration of other physical properties such as toughness and impact strength.

Flame-retardant materials such as the halogenated aliphatic and aromatic compounds which are compatible with the styrene polymer family of plastics often act as plasticizers and lower the modulus of the polymer causing a reduction in the tensile strength of articles molded from the polymers.

Certain metal oxide compounds, e.g., antimony oxide and combinations of halogenated organic compounds provide a synergistic fire retardant effect in many polymer systems. However, such combinations are not predictable in that many such combinations lower the melting point of the polymer causing it to pyrolyze more readily, hence, actually increasing flammability. Beyond flammability such combinations have caused the polymer systems to degrade during heat processing or on exposure to light.

Polymeric halogenated plasticizers such as polyvinyl chloride and chlorinated olefins have been tried to overcome the deficiencies of the lower molecular weight halogenated organic compounds. Such polymeric materials, however, as used in the styrene family of plastics have lowered their heat stability during processing and given lower physical properties particularly lower modulus, heat distortion and impact strength.

A need exists in the art for styrene polymers and copolymers which exhibit improved fire retardant properties without a corresponding decrease in other physical properties such as modulus, tensile and impact strength.

SUMMARY OF THE INVENTION

The above needs have been met by the polyblends of the present invention. These polyblends have good flame retardant properties as determined by the UL-94 test and good physical properties such as impact strength and modulus.

The polyblend compositions of the present invention comprise:

A. a polymer of a monovinylidene aromatic monomer and an ethylenically unsaturated nitrile monomer wherein the weight ratio of monovinylidene aromatic monomer to nitrile monomer is in the range of 95/1 to 1/95;

B. from 16.5 to 80% by weight based on the total weight of the polyblend, of a grafted, crosslinked polychloroprene rubber having a Mooney viscosity of at least 200 (MS 2½ min. 212° F.), said rubber being grafted with:

1. at least one monovinylidene aromatic monomer, and
2. an ethylenically unsaturated nitrile monomer wherein the weight ratio of monovinylidene aromatic monomer to nitrile monomer in the grafted rubber is in the range of 95/1 to 1/95; wherein the amount of polychloroprene rubber in the polyblend is in the range of from 15 to 40% by weight, based on the total weight of the polyblend;

C. from 0.5 to 5% by weight, based on the total weight of the polyblend, of a butadiene rubber having a particle size in the range of from 0.7 to 4.0 microns, said butadiene rubber having been grafted with;

1. at least one monovinylidene aromatic monomer, and
2. an ethylenically unsaturated nitrile monomer wherein the weight ratio of monovinylidene aromatic monomer to nitrile monomer in the grafted rubber is in the range of 95/1 to 1/95; and D. from 1 to 15% by weight, based on the total weight of the polyblend of an inorganic compound selected from the group consisting of $Sb_2O_3$, $Bi_2O_3$, $MoO_3$, $SnO_2$, $WO_3$, and mixtures of the same.

The present invention also relates to shaped articles prepared from the polyblend compositions described herein.

The monovinylidene aromatic monomers used in the present invention include styrene, ring substituted alkylstyrenes such as o-, m-, and p-methylstyrene, -ethylstyrene, -isopropylstyrene, -butylstyrene, -tertiary butylstyrene; alpha-alkylstyrene such as alpha-methylstyrene, alpha-ethylstyrene, ring substituted halostyrene, e.g., o-, m-, and p-chlorostyrene, bromostyrene, fluorostyrene; various di, tri, tetra and penta substituted chlorostyrenes, bromostyrenes and fluorostyrenes and various alpha- and beta-halosubstituted styrenes, e.g., alpha-chlorostyrenes, alpha-bromostyrenes, beta-chlorostyrenes, beta-bromostyrenes, and beta-halosubstituted styrenes and the like. Especially preferred monomers are styrene, alpha-methylstyrene and ring substituted chlorostyrene and bromostyrene.

The ethylenically unsaturated nitrile monomers used in the polymers of this invention include acrylonitrile, methacrylonitrile, ethacrylonitrile, and the like with acrylonitrile and methacrylonitrile being preferred. Either the vinylidene aromatic monomer or the ethylenically unsaturated nitrile monomer can be used in major proportions relative to one another in the copolymerization and/or grafting steps. Preferably, the amount of vinylidene aromatic monomer will be in the range of 20 to 80% by weight based on the total weight of vinylidene aromatic monomer and unsaturated nitrile monomer. Correspondingly, the amount of the unsaturated nitrile monomer will be in the range of 80 to 20% by weight.

In applications where properties such as gas impermeability, light stability, weatherability are desired, it is preferred to have the nitrile monomer present in the range of from 55 to 80% by weight based on the total weight of vinylidene aromatic monomer and unsaturated nitrile monomer. When barrier properties are not required, it is most preferred to have the nitrile monomer present in amounts from 20 to 40% by weight.

The monovinylidene aromatic monomer may be halogen substituted providing an additional halogen source for flame retarding.

The polychloroprene rubber component used in the present invention is polychloroprene or a copolymer of chloroprene and at least one other monomer such as butadiene, acrylonitrile, methacrylonitrile, styrene, ring substituted halostyrene, alpha-halostyrene, ring substituted alkylstyrene, alpha-alkylstyrene, vinyl chloride, etc. The amount of comonomer used is in the range of 0 to 20% based on the weight of polychloroprene rubber copolymer.

Chloroprene rubbers are commercially available as solid rubbers or rubber latices (also referred to as emulsions). The preferred polychloroprene rubber used in the present invention are those in latex form. The chloroprene rubber used is crosslinked either before or during processing in order to maintain its particulate nature. The most preferred chloroprene rubbers used in latex or emulsion graft systems are crosslinked to a medium to high gel content and have a Mooney viscosity above at least about 200 (MS 2½ min. 212° F.). These rubber latices are sold by E. I. duPont Company as Neoprene Latices, e.g., Neoprene 842A. Neoprene Latices available from the E. I. duPont de Nemours and Company, Wilmington, Delaware are described in the reference "Neoprene Latex" by J. C. Carl published by duPont in 1962. In general the Neoprene latices have a rubber solids content of about 34.5% to 60%, a pH of about 9 to 13, latex specific gravity of about 1.10 to 1.15, rubber specific gravity of 1.23 to 1.42, latex viscosity of 16 to 400 cps. (Brookfield viscosity) and the latices are stabilized by anionic or cationic emulsifiers. The rubber particle size distribution of such latices can be varied so as to give the selected weight average particle size range desired and disclosed in this invention. Other polychloroprene latices are also commercially available from the Petro-Tex Chemical Corporation of Houston, Texas.

The chloroprene rubbers in latex or emulsion form are readily grafted by dispersing the reacting monomers, e.g., styrene and acrylonitrile in the latex or emulsion and then grafting such monomers onto the rubber using conventional polymerization methods. As the polymerization progresses a copolymer of styrene and acrylonitrile (SAN) is also formed in the reacting mixture. Such polyblends have much greater impact strength than the rigid SAN phase alone. In the present invention the grafted chloroprene provides improved impact strength and flame retardancy.

The percent of monomer grafted onto the polychloroprene rubber is a controlled amount and can be varied from about 10 to 100% depending on the weight average particle size of the rubber and the properties desired. The percent graft is defined as the weight percent of monomers grafted onto the rubber particle, based on the weight of the rubber, e.g., 100 grams of rubber grafted with 100 grams of monomers has 100% by weight of grafted monomers.

The weight average particle size of the rubber is selected to provide a balance of good physical properties such as impact strength and gloss. The polychloroprene rubber latices used have a rubber particle size (before grafting) of from about 0.01 to 0.60 micron with about 0.05 to 0.35 micron being preferred. The most preferred size is 0.05 to 0.20 micron in order to give the polyblend desirable impact strength and high gloss. These rubber particles (0.05 to 0.35 micron) are grafted in a preferred range of 10 to 30% by weight.

The polyblends of the present invention contain from about 15 to 40% by weight, of the chloroprene rubber component (calculated as ungrafted rubber) based on the total weight of the polyblend. When polychloroprene rubber copolymers are used, the weight of the copolymer is selected to provide 15 to 40% by weight of chloroprene rubber units in the polyblend. The above values correspond to about 16.5% to 80% by weight, of grafted polychloroprene rubber considering that the graft level can be from about 10% to 100% by weight of the polychloroprene rubber.

In addition to the grafted polychloroprene rubber component, the polyblends of the present invention contain a grafted polybutadiene rubber component which serves to provide better impact properties, especially low temperature impact. Polychloroprene rubbers have a second order transition temperature (Tg by ASTM Test D-746-52T) of about −40° C. and become brittle as this temperature is approached in use. Polyblends containing only grafted polychloroprene as the rubber component lose impact strength as the polyblend reaches this temperature because the grafted rubber particles of the polyblend become brittle and can no longer absorb stress. Polybutadiene rubbers have a lower Tg than the polychloroprene and provide better low temperature impact properties in the polyblends of the present invention.

The polybutadiene rubbers used are homopolymers of butadiene and copolymers of butadiene which contain up to 30% by weight of a comonomer selected from the group consisting of styrene, acrylonitrile, vinyl chloride, alkyl acrylates and alkyl methacrylates containing from 1 to 8 carbon atoms in the alkyl groups, vinyl chloride, etc.

The polybutadiene rubbery substrates used in the present invention are in the form of solid rubbers or rubber latices. The preferred rubber latices have particle sizes in the range of from 0.07 to 4.0 microns before grafting, a gel content in the range of from 40 to 95%, a swelling index in the range of from 10 to 40, and a second order transition temperature (Tg) less than −20° C. and preferably less than −40° C. as determined by ASTM Test D-746-52T. The above specified gel content and swelling index are indicative of the degree of crosslinking in the rubber. The polybutadiene rubbers used are grafted with 50 to 150% by weight of the vinylidene aromatic and ethylenically unsaturated monomers described above with reference to the grafting of the polychloroprene rubber. The grafted polybutadiene rubber particles have a preferred weight average size of from about 0.7 to 4.0 microns and most preferred 0.8 to 1.2 microns, when used in combination with a polychloroprene rubber having a particle size in the range of from about 0.05 to 0.35 micron. The grafted polybutadiene rubber is used in amounts of from 0.5% to 5.0% by weight, preferably 1% to 3% by weight based on the weight of the total polyblend.

It is further critical to the present invention to have present in the polyblend at least about 1% by weight of the polyblend of an inorganic compound with the preferred range of about 1% to 15% and the most preferred amount being about 6% to 12%.

The inorganic compounds preferred are metal oxide such as $Sb_2O_3$, $Bi_2O_3$, $MoO_3$, $SnO_2$, $WO_3$, and the like. The most preferred being $Sb_2O_3$.

The following examples are presented in illustration of the present invention and are not intended in any way to limit the scope or spirit thereof.

TEST PROCEDURES

Underwriter's Laboratory UL-94 Test (1)

Fire retardant properties are measured using the above test which is carried out on test specimen 6 × ½ × 150 inches. When other sample thicknesses are used the stated thickness is given. The numerical ratings used in reporting the results of the laboratory tests are not intended to reflect hazards presented by the compositions of the present invention or any other material under actual fire conditions.

(1) The numerical flame spread ratings are not intended to reflect hazards presented by the presently claimed polyblends or any other materials under actual fire conditions.

The test specimen is supported from the upper end, with longest dimension vertical, by a clamp on a ring stand so that the lower end of the specimen is ⅜ above the top of the burner tube. The burner is then placed remote from the sample, ignited, and adjusted to produce a blue flame ¾ in height.

The test flame is placed centrally under the lower end of the test specimen and allowed to remain for 10 seconds. The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming combustion of the specimen stops. The test flame is again withdrawn, and the duration of flaming combustion of the specimen noted.

If the specimen drops flaming particles or droplets while burning in this test, these drippings shall be allowed to fall onto a horizontal layer of cotton fibers (untreated surgical cotton) placed one foot below the test specimen. Significantly flaming particles are considered to be those capable of igniting the cotton fibers.

The duration of flaming or glowing combustion of vertical specimens after application of the test flame, average of three specimens (6 flame applications) shall not exceed 25 seconds (maximum not more than 30 seconds), and the portion of the specimen outside the clamp shall not be completely burned in the test.

Materials which comply with the above requirements and do not drip any flaming particles or droplets during the burning test will classify as "self-extinguishing, Class I" according to the nomenclature used in the UL-94 test.

Materials which comply with the above requirements, but drip flaming particles or droplets which burn only briefly during the test will classify as "self-extinguishing, Class II" according to the nomenclature used in the UL-94 test.

Class SE-O is given to materials wherein the duration of flaming or glowing combustion averages less than 5 seconds under the conditions above.

Flammability of Plastics Using the Oxygen Index Method

ASTM Test D-2863 is used with the General Electric Flammability Index Tester Model A-4990-A. A sample bar ⅛ × ½ × 5 inches is molded and placed in the above tester. The tester is attached to an oxygen tank and a nitrogen tank. By means of control valves, an atmosphere can be created inside the tester containing any desired ratio of nitrogen to oxygen. The lower the oxygen concentration which will support combustion, the higher the degree of flammability of the test specimen. It is generally considered that the oxygen content should be at least 20% for combustion support in order for a material to be considered sufficiently flame resistant. Of course, the higher the value, the better. A propane torch flame is applied to one end of the test specimen in the tester. If the specimen burns for at least three minutes, the concentration of oxygen is reduced. By a system of trial and error with several specimens the limiting oxygen concentration is determined where burning will just be supported for at least three minutes, but will not be supported at an oxygen concentration 1% lower. This limiting concentration is then reported as the Limiting Oxygen Index (LOI).

Weight Average Particle Size Test

The weight average particle size is determined by dispersing the polyblend in water using 2 grams of polyblend in 98 grams of water. The dispersion is then diluted 3 to 1 with methyl-ethyl-ketone and analyzed according to the published procedure of Groves, M. J., Kaye, B. H., Scarlett, B., "Size Analysis of Subsieve Powders Using A Centrifugal Photosedimentometer", British Chemical Engineering, Vol. 9:742–744 (1964). A Model 3000 Particle Size Analyzer available from Martin Sweets Company, 3131 West Market Street, Louisville, Kentucky, was used.

Impact Strength Test

ASTM Test D-256 - Method A commonly known as the Izod Test. Impact values are a measure of toughness and high values are needed for engineering applications preferably greater than 1.5 ft.lbs./in.

Heat Distortion Temperature Under Load

ASTM Test D-648 was used with a load of 264 psi. Test values here should remain high so that the polyblend is functional at high temperatures in engineering applications, e.g., automotive and appliances.

Graft Level Test

Weight out 1 gram of grafted resin and disperse in 20 ml of a solvent of 50/50 dimethylformamide/methyl ethyl ketone. The matrix polymer will dissolve. Centrifuge and decant off the solvent. Repeat the process three times and dry the grafted rubber under vacuum and weigh.

% Graft = wgt. of grafted rubber − wgt. of rubber × 100/wgt. of rubber

Sample Preparation

The plastic to be tested is usually in comminuted form. A portion of the plastic particles are compression molded at 330°–360° F. at 7200 psi to form a sheet about ⅛ inch thick. Sample bars are then cut from the molded sheet having dimensions of ⅛ × ½ × 6 inches.

Embodiments

Samples of polyblend polymers are prepared using ungrafted and grafted chloroprene rubber to demonstrate the properties of the two types and their ability to provide flame retardant properties and impact strength to the styrene family of polymers. Other pertinent physical properties are measured such as the heat distortion under load and gloss.

EXAMPLE 1

CONTROL

A typical polyblend of styrene-acrylonitrile copolymer (SAN) containing about 25% AN and a grafted polybutadiene rubber grafted with a 75/25 S/AN ratio of monomer is used. The polyblend containing about 23% rubber and about 77% SAN by weight, is available from the Monsanto Company of St. Louis, Missouri as Lustran I 740. The impact strength is 5.0 ft.lbs./in. at 73° F.; the percentage of oxygen that just supports combustion is 18% (LOI) and will not pass the UL-94 test. Those skilled in the art would recognize that this polyblend has a desirably high impact strength but that it is too low in flame retardancy for such uses. The grafted rubber than has the necessary compatibility to reinforce the polyblend to give high toughness.

EXAMPLE 2

CONTROL

A polyblend with SAN copolymer (Monsanto Company LNA 21) is prepared using 65 parts SAN copolymer, 30 parts of solid chloroprene rubber (duPont Neoprene W) and 5 parts of $Sb_2O_3$. The polyblend is colloided on a Bolling roll mill using 130 psi steam pressure to reach a melt temperature of 400°–450° F. for 5 minutes after which the polyblend is stripped from the mill, cooled and comminuted. Test samples were prepared. The UL-94 test gives values of SE-O. The impact strength test gives and Izod of less than 0.5 ft.lbs./in. demonstrating that chloroprene that is both a noncrosslinked and ungrafted rubber lacks the necessary compatibility with the rigid phase SAN copolymer to produce a tough polyblend.

EXAMPLE 3

CONTROL

A polyblend is prepared by first blending an emulsion of an SAN copolymer with an emulsion of chloroprene rubber (duPont Latex 842-A sold by E. I. duPont de Nemours Company of Wilmington, Delaware) and coagulating with aluminum sulfate to form a crumb having 40% rubber and 60% SAN. The emulsion SAN copolymer is prepared using the following formulation based on parts per 100 parts of total monomers:

| | |
|---|---|
| Styrene | 70 |
| Acrylonitrile | 30 |
| Water | 116 |
| Potassium Persulfate | 0.005 |
| Terpinoline | 0.003 |
| Rubber Reserve Soap (Emery Industries of Cincinnati, Ohio. Sodium salt of oleic, stearic and pamitic acids) | 0.018 |
| Darvan No. 1 (Sodium salt of a formaldehyde naphthalene sulfonate sold by Dewey and Almy of Cambridge, Mass.) | 0.005 |

The monomers are dispersed in water containing the soap and Darvan and polymerized at 95° C. under reflux for 3 hours and 45 minutes in the presence of the potassium persulfate and catalyst and the terpinoline modifier under agitation. The emulsion contains 46.3% of SAN polymer in the emulsion.

The average particle size of the rubber particles in the chloroprene rubber latex and the polyblend is observed to be about 0.12 micron (weight average based on centrifugal photosedimentation method).

The crumb is mchanically blended with an SAN copolymer (Monsanto LNA 21 sold by Monsanto Company of St. Louis, Missouri) and tested as in Example 2 with the blend having 30 parts chloroprene rubber, 65 parts SAN copolymer and 5 parts $Sb_2O_3$. The Izod test values are 1.5 ft.lbs./in. The UL-94 test gives SE-O values. The percentage of oxygen to support combustion is 25.1% (LOI) and the heat distortion under load at 264 psi is 195° F. It is evident that the polyblend has a high degree of flame retardance, a high heat distortion temperature and a higher degree of toughness because the rubber is crosslinked. The emulsion blending does provide a better polyblend than that of Example 2 having an impact strength of 1.5 ft.lbs./in. versus 0.5 ft.lbs./in. for a blend of solid rubber and copolymer wherein the rubber is not crosslinked.

EXAMPLE 4

Graft chloroprene rubber is prepared by the following procedure:

| | |
|---|---|
| A reaction mixture of by parts: | |
| Chloroprene Rubber (duPont Latex 842 A 50% solids) | 100 |
| Styrene Monomer | 28 |
| Acrylonitrile Monomer | 12 |
| Emulsifying Agent (Dowfax 2A1, a sodium salt of an alkyl diphenyl oxide sulfonate sold by Dow Chemical of Midland, Michigan) | 1 |
| Potassium persulfate initiator | 1 |
| Terpinoline Modifier | 0.5 |
| Water | 260 |

The chloroprene latex, water, Dowfax and terpinoline are added to a stirred reactor and brought to 85° C. The monomers and initiator are added to the reaction over a period of 2 hours with a final finishing period of 1½ hours to give a latex having a solids level of 35%. The average particle size of the rubber particles in the latex is observed to be about 0.12 micron (weight average based on centrifugal photosedimentation method). A grafted chloroprene rubber is formed along with SAN copolymer. The resulting latex is further blended with the SAN latex of Example 3 and coagulated using aluminum sulfate to recover the solid polyblend. Analysis of the polyblend shows the blend to be 30% polychloroprene having 14.4 weight percent of SAN grafted based on rubber; 65% SAN copolymer including the grafted SAN. The blend is further melt colloided on a mill as in Example 2 with 5% $Sb_2O_3$ and the comminuted polyblend tested. The Izod impact strength is 4.4 ft.lbs./in; the heat distortion temperature under load is 191° F.; the UL-94 test values are SE-O and the percentage oxygen to support combustion is 25.6% (LOI).

It is evident that the grafted chloroprene provides the polyblend with high impact strength or toughness and high flame retardancy without sacrificing the heat distortion temperature for functional engineering uses.

EXAMPLE 5

Example 4 is repeated running to a total lower conversion of 75% wherein the SAN graft level on the chloroprene rubber is 11.4% by weight based on rubber. The final polyblend admixture contains 30% chloroprene, 65% SAN copolymer and 5% $Sb_2O_3$ as in Example 4. The admixture is melt colloided as in Example 2 and the comminuted polyblend tested. The Izod impact strength is 2.3 ft.lbs./in. showing a lower level of toughness when the graft level is lower and providing lower interaction with the rigid SAN phase but higher than the ungrafted chloroprene rubbers of Examples 1 and 2. The UL-94 test gives values of SE-O. The percentage oxygen to support combustion is 25.3% (LOI) and the heat distortion temperature under load is 197° F.

EXAMPLE 6

A higher grafted chloroprene is prepared by using the following formultion based on parts per 100 parts of total monomers:

| | |
|---|---|
| Styrene | 70 |
| Acrylonitrile | 30 |
| Chloroprene Rubber (duPont Latex 842 A 50% solids) | 100 |
| Terpinoline | 1 |
| Darvan No. 1 | 1 |
| Potassium Persulfate | 1 |
| Rubber Reserve Soap | 1 |
| Water | 270 |

The Darvan No. 1 is added to the water and the chloroprene rubber latex is then dispersed followed by the monomers and the catalyst. The monomers and catalyst are added at 25 parts per hour on 70/30 ratio basis with proportionate amounts of catalyst over a 4 hour period. The rubber reserve soap is added after one half of the monomers have been added. The polymerization is carried out at 85° C., under agitation to give a latex with about 35% final solids. A grafted chloroprene rubber is formed along with SAN copolymer. The resulting latex is further blended with the SAN latex of Example 3 and coagulated using aluminum sulfate to recover the solid polyblend. The average particle size of the rubber particles in the polyblend are observed to be about 0.12 micron (weight average). The SAN graft on the chloroprene rubber is 48.0% by weight based on rubber. The final polyblend admixture contains 30% chloroprene, 65% SAN copolymer and 5% $Sb_2O_3$ as in Example 4. The admixture is melt colloided as in Example 2 and the comminuted polyblend tested. The Izod impact is 0.8 ft.lbs./in. showing low impact values and toughness; the UL-94 test shows values of SE-O and the heat distortion under load is 170° F. showing loss of heat distortion. It is evident that too high a level of grafting on the small chloroprene rubber particles lowers toughness.

EXAMPLES 7, 8, 9 and 10

Latex blends of lower graft and higher graft polychloroprene rubber are made using the grafted rubbers of Examples 4 and 6 as low and high respectively to give blends that have 30% chloroprene rubber by weight. These blends are in turn blended with SAN latex as in Example 3. The final admixtures were made to have the following compositions as tabulated below along with the physical tests of each composition. The Peak Hunter Gloss values are determined by measuring the gloss of a molded sample on a Hunter Laboratory Model D-36 Glossmeter supplied by Hunter Associates of McLean, Virginia.

| | Examples | | | |
|---|---|---|---|---|
| | 7 | 8 | 9 | 10 |
| Low Graft Rubber | 30 | 15 | 9 | 0 |
| High Graft Rubber | 0 | 15 | 21 | 30 |
| SAN copolymer | 65 | 65 | 65 | 65 |
| Antimony Oxide | 5 | 5 | 5 | 5 |
| Izod Impact Strength | 4.4 | 3.1 | 2.7 | 0.8 |
| HDTUL (264 psi) | 191 | 182° F | 182° F | 176 |
| UL-94 | SE-O | SE-O | SE-O | SE-O |
| Peak Hunter Gloss | 0 | 4 | 23 | 64 |

It is evident from the test values that low graft chloroprene rubbers can upgrade the high graft chloroprene rubbers to a high level of toughness bringing them from about 0.8 ft.lbs./in. to levels of toughness over 1.5 ft.lbs./in. generally accepted for impact polyblends. It is also evident that the gloss level for the high graft rubber types is higher than for the low graft rubbers.

EXAMPLES 11 – 15

Rubber Particle Size Parameters

The chloroprene latex is observed to have an average rubber particle size of about 0.12 micron (weight average). The latex is agglomerated to give larger particles for testing as in Examples 4–10. Agglomeration is carried out according to the following procedures using:

| | | |
|---|---|---|
| Chloroprene Rubber (duPont Latex 842 A 25% solids) | 100 | pts. |
| Emulsifying Agent (Dowfax 241) | .045 | pts. |
| Acetic Anhydride | 6 | pts. |
| Water | 300 | pts. |

Dissolve 6 parts of the acetic anhydride in 60 ml of water and add to the rubber latex containing the Dowfax. Stir for 30 seconds after addition and let stand 30 minutes. Add 2 pts. of Dowfax to the emulsion to stabilize the emulsion. The average particle size of the rubber particle is observed to be about 0.50 micron (weight average).

The above emulsion is then grafted according to the procedure of Example 6 using varying amounts of terpinoline and catalyst to vary the conversion and percent graft. The grafted rubber emulsion is then processed into a polyblend and tested as in Example 6.

| | Examples | | | | |
|---|---|---|---|---|---|
| | 11 | 12 | 13 | 14 | 15 |
| Catalyst | 1.0 | 1.0 | 1.5 | 1.0 | 1.0 |
| Terpinoline (parts) | 1.0 | 0.5 | 0.0 | 0.0 | 0.5 |
| Graft level (wgt. %) | 2.5 | 8.9 | 15.0 | 21.9 | 27.3 |
| % Conversion | 64 | 77 | 85 | 99 | 82.0 |
| Wgt. % rubber | 30 | 30 | 30 | 30 | 30 |
| Wgt. % SAN | 70 | 70 | 70 | 70 | 70 |
| Wgt. % $Sb_2O_3$ | 5 | 5 | 5 | 5 | 5 |
| Izod impact | 2.3 | 2.3 | 2.3 | 2.9 | 1.5 |
| Hunter Gloss | 23 | 41 | 49 | 50 | — |
| HDTUL ° F. | 183 | 180 | 185 | 185 | 177 |
| UL-94 | SE-O | SE-O | SE-O | SE-O | SE-O |

The data show that the percent graft can be varied from about 2.5 to about 30% with an average chloroprene rubber particle size of about 0.5 micron (weight average) before impact strength begins to drop with the gloss improving as the weight percent increases. It is also evident that these low graft rubbers having an average particle size of about 0.50 micron have reasonably high gloss compared to low graft chloroprene rubbers of Examples 4–5, having an average rubber particle size of about 0.12 micron. This would indicate that the smaller particle size rubbers provide much greater surface area for grafting, hence, are effectively less grafted and can agglomerate to give larger particles to improve impact strength but then lower gloss. Regardless of the theory the percent graft should be adjusted relative to particle size to provide both good impact strength and gloss within the parameters shown. In addition, it is observed that the heat distortion is high and the polyblends have good flame retardant properties.

EXAMPLES 16–17

Examples 8 and 9 are repeated here using a blend of high graft rubber of Example 6 having an average particle size of about 0.12 micron and a graft level of 48.0 percent and the low graft rubber of Example 13 having an average rubber particle size of about 0.5 micron and a graft level of about 15.0 weight percent. The test results are:

|  | Example 16 | Example 17 |
|---|---|---|
| Wgt. % Low Graft Rubber | 3 | 6 |
| Wgt. % High Graft Rubber | 27 | 24 |
| Wgt. % SAN Polymer | 70 | 70 |
| Wgt. % $Sb_2O_3$ | 5 | 5 |
| Izod Impact Strength | 2.1 | 2.4 |
| Hunter Gloss | 45 | 60 |
| HDTUL | 176 | 178 |
| UL-94 | SE-O | SE-O |

The test data show high impact polyblends can be produced using 10 to 20% by weight of low graft chloroprene rubber having a particle size in the range of about 0.50 micron with 80% to 90% of a high graft chloroprene rubber having rubber particles in the range of about 0.12 micron. Also, the gloss of such blends has high values along with other good heat distortion temperatures and good flame retardant properties.

EXAMPLE 8

Part A

Fourteen parts of a soluble butadiene rubber were dissolved in 26.0 parts of acrylonitrile and 60.0 parts styrene. There were added thereto 0.07 part of a mixture of tertbutyl peracetate, 0.05 part di-tert-butyl peroxide and stabilizers. The mixture was heated to 100° C. with stirring. Terpinoline was added as a chain transfer agent over a period of approximately 5 hours in an amount of about 0.1 part per hour for approximately five hours, at the end of which time an additional 10.4 parts were added.

At 30.0 percent conversion of the monomers the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexylacrylate which has a specific viscosity of about 4.0 as determined in a 1.0 percent solution in water at 25° C. The resulting suspension was stirred and heated to polymerize the remaining monomer, cooled, centrifuged, washed and dried to recover the graft copolymer in the form of small spherical beads. The ratio of superstrate to substrate was about 0.9 to 1.0:1.0, and the particle size was about 0.9 micron.

Part B

Seventy grams of beads from Part A are milled and melt colloided as in Example 2 with the 930 grams of the final polyblend admixture of Example 6. The final polyblend now contains about 1% of polybutadiene rubber. The milled polyblend is comminuted and tested.

Part C

Using the above procedure 210 grams of Part A were colloided with 790 grams of the final polyblend of Example 6. The final polyblend now contains about 3% polybutadiene rubber. The milled polyblend is comminuted and tested. The test data on the two polyblends B and C are shown below:

| Polyblend | UL-94 Test | Impact Test | HDLT Test | Gloss Test |
|---|---|---|---|---|
| Part B | SE-O | 2.5 ft.lbs. | 187° F. | 70 |
| Part C | SE-O | 7.0 ft.lbs. | 177° F. | 50 |

The butadiene rubber used in Example 18 is a high-cis polybutadiene rubber having a cis-isomer content of about 30% to 98% and having a second order transition temperature, Tg, of from about −50° to −105° C. as determined by ASTM Test D-746-52T. Such rubbers are available as Diene 35 and 55 from the Firestone Rubber Company of Akron, Ohio and as Polysar Taktene 1202 from the Polymer Corporation of Sarnia, Ontario.

EXAMPLES 19–23

Polyblend Proportions Tested

The grafted chloroprene latex of Example 6 having about 35% solids was coagulated with aluminum sulfate and the solid recovered as a crumb and dried. The solids analyze 74% grafted rubber and 26% SAN copolymer as the rigid phase. The rubber crumb is 50% chloroprene rubber and has 48% by weight of grafted SAN contributing 24% SAN copolymer to the crumb. The rubber has a particle size of 0.12 micron. The grafted rubber latex of Example 13 having a rubber particle size of 0.5 micron is also coagulated with aluminum sulfate, recovered as a crumb and dried. The solids analyze 50% by weight rubber, having a graft level of 15% SAN contributing 7.5% by weight of SAN to the crumb along with 42.5% SAN copolymer as the rigid phase.

The SAN latex of Example 3 is coagulated with aluminum sulfate and the solids recovered as a free flowing SAN powdered polymer. The grafted rubber crumb of Examples 6 and 13 and the SAN polymer of Example 3 are dry blended with $Sb_2O_3$ to form admixtures and melt blended at 425° F. to a uniform polyblend. The polyblends are molded into specimens and tested for flame retardant properties and impact strength. The proportions of the above described materials for each polyblend are tabulated below along with the test results.

EXAMPLES

| Admixture | Proportions by Weight % | | | | |
|---|---|---|---|---|---|
| | 19 | 20 | 21 | 22 | 23 |
| Ex. 6 Crumb | 24.0 | 32.0 | 36.8 | 64.0 | 64.0 |
| Ex. 6 Rubber | 12.0 | 16.0 | 18.4 | 32.0 | 32.0 |
| Ex. 6 Graft SAN | 5.8 | 7.7 | 6.8 | 15.4 | 15.4 |
| Ex. 6 SAN | 6.2 | 8.3 | 11.6 | 16.6 | 16.6 |
| Ex. 13 Crumb | 6.0 | 8.0 | 9.2 | 16.0 | 16.0 |
| Ex. 13 Rubber | 3.0 | 4.0 | 4.6 | 8.0 | 8.0 |
| Ex. 13 Graft SAN | 0.5 | 0.6 | 0.7 | 1.2 | 1.2 |
| Ex. 13 SAN | 2.5 | 3.4 | 3.9 | 6.8 | 6.8 |
| Ex. 3 SAN | 55.0 | 51.0 | 44.0 | 16.0 | 19.0 |
| Total Rubber | 15.0 | 20.0 | 23.0 | 40.0 | 40.0 |
| Total SAN | 70.0 | 71.0 | 67.0 | 56.0 | 59.0 |
| $Sb_2O_3$ | 15.0 | 9.0 | 10.0 | 4.0 | 1.0 |
| UL-94 Test | SE-0[1] | SE-0[1] | SE-0[2] | SE-0 | SE-0[3] |
| Impact Strength ft.lbs./sq.ft. | 1.0 | 1.5 | 1.8 | 3.2 | 3.6 |

[1]UL-94 with 1/8 inch (0.125 inch) thick test specimen.
[2]UL-94 with 0.07 inch thick specimen.
[3]UL-94 with 0.250 inch thick specimen.

It is evident from the test data above and from the examples previously described that the grafted chloroprene rubber provides good impact over the range of 15 to 40% by weight and provides flame retardant properties in combination with $Sb_2O_3$ over a range of 1 to 15% by weight.

EXAMPLES 25 to 36

Examples 24 to 36 illustrate other variations in proportions of ingredients within the framework of the present invention. The polyblends in these examples are prepared and tested according to the procedure set forth above except that the UL-94 test used is conducted according to the modified procedure described in "Test for Flammability For Plastic Materials - UL-94", September 17, 1973. This test is substantially the same as the UL-94 test reported above and the results are reported in terms of V-0, V-1, and V-2 values instead of the SE-0, SE-1 and SE-2 values used previously.

The results of the tests on Examples 24 to 36 are summarized in tabular form below.

polychloroprene rubber, which is crosslinked and which has a Mooney viscosity greater than 200, is grafted with about 20 parts of a styrene/acrylonitrile (75/25) monomer mixture. The particle size of the polychloroprene rubber prior to grafting is about 0.12 micron. The polybutadiene rubber used is grafted with about 70 to 80 parts styrene/acrylonitrile (67/73) monomer to provide a grafted butadiene containing about 25% rubber graft and 75% free SAN polymer. The particle size of the butadiene rubber is about 1.6 microns prior to grafting. In the above table the percentages of the polychloroprene rubber and the butadiene rubber given are based on the weight of the rubber prior to being grafted.

EXAMPLES 37 and 38

The following examples, which are prepared according to the general procedures set forth above, illustrate the criticality of the upper limit of 5% by weight of grafted polybutadiene rubber in the blend. A summary of Examples 37 and 38 is set forth below.

| Example | 37 | 38 |
|---|---|---|
| Polychloroprene Rubber (%) | 20 | 20 |
| Polybutadiene Rubber (%) | 2.5 | 5.0 |
| Antimony Oxide (%) | 7.5 | 7.5 |
| Decabromobiphenyl Ether | 5 | 5 |
| SAN Polymer (%)[1] | 65 | 62.5 |
| UL-94 Rating[2] | | |
| V-1 | 70 | 70 |
| V-0 | 70 | 70 |
| Izod Impact | | |
| ½" × ½" (ft.lb.)/inch notch | 3.41 | 5.4 |
| HDTUL. Unann. (° C) | | |
| ½" × ½", 264 psi | 74 | 73 |
| Tensile Strength at Yield (psi) | 5000 | 4300 |
| Tensile Strength at Fail (psi) | 4300 | 3800 |
| Tensile Elongation at Yield (%) | 2.6 | 2.5 |
| Tensile Modulus (psi) × 10⁵ | 2.64 | 2.20 |

[1]The total amount of the grafted and ungrafted (matrix) SAN polymer in the blend.
[2]The numbers given are the thicknesses of the samples in mils at which a rating of V-1 or V-0 are obtained.

SUMMARY OF EXAMPLES 24 to 36

| Example | 24 | 25 | 26 | 27 | 28 | 29 | 30 | 31 | 32 | 33 | 34 | 35 | 36 |
|---|---|---|---|---|---|---|---|---|---|---|---|---|---|
| Polychloroprene Rubber (%) | 16 | 16 | 16 | 18 | 20 | 20 | 20 | 20 | 22 | 24 | 24 | 24 | 24 |
| Polybutadiene Rubber (%) | 2.5 | 2.5 | 2.5 | 2.5 | 2.5 | 2.5 | 2.5 | 1.5 | 2.5 | 2.5 | 2.5 | 2.5 | 1.5 |
| Antimony Oxide (%) | 6 | 9 | 12 | 9 | 6 | 9 | 12 | 6 | 9 | 12 | 9 | 6 | 6 |
| SAN Polymer (%)[1] | 75.5 | 72.5 | 69.5 | 70.5 | 71.5 | 68.5 | 65.5 | 72.5 | 66.5 | 61.5 | 64.5 | 67.5 | 68.5 |
| UL 94 Rating[2] | | | | | | | | | | | | | |
| V-1 | No | 125 | 90 | 100 | No | 90 | 70 | No | 80 | 70 | 80 | 125 | 125 |
| V-0 | No | No | No | No | No | No | 90 | No | 125 | 80 | 80 | No | No |
| Izod Impact | | | | | | | | | | | | | |
| ½" × ½" (ft.lb) inch notch | 3.2 | 2.2 | 2.5 | 3.0 | 3.3 | 3.2 | 3.3 | 1.7 | 3.0 | 2.6 | 3.1 | 3.1 | 1.9 |
| HDTUL, Unann. (° C) | | | | | | | | | | | | | |
| ½" × ½", 264 psi | 84 | 85 | 83 | 86 | 84 | 84 | 82 | 85 | 81 | 82 | 81 | 84 | 82 |
| Tensile Strength at Yield (PSI) | 5800 | 5700 | 5600 | 5500 | 5600 | 5700 | 5600 | 6100 | 5400 | 4900 | 5000 | 5300 | 5500 |
| Tensile Elongation at Fail (%) | 23 | 37 | 31 | 18 | 26 | 25 | 26 | 13 | 20 | 42 | 22 | 20 | 13 |
| Tensile Modulus (psi) X10⁵ | 3.61 | 3.71 | 3.74 | 3.47 | 3.38 | 3.40 | 3.30 | 3.56 | 3.62 | 2.98 | 2.81 | 3.30 | 3.09 |

[1]The total amount of the grafted and ungrafted (matrix) SAN polymer in the blend.
[2]The numbers given are the thicknesses of the samples in mils at which a rating of V-1 or V-0 is obtained. The expression "No" indicates that up to a thickness of ⅛ inch (125 mils) the sample did not obtain the designated rating.

The polychloroprene rubber used in Examples 24 to 36 is Neoprene Latex ECD-3097 which is available from E. I. duPont de Nemours and Company. The A review of the above data indicates that when using 5% grafted polybutadiene rubber, the Izod impact strength goes up. However, the tensile strength, tensile elongation and tensile modulus goes down indicating that increasing amounts of graft polybutadiene rubber component cause these properties to fall off. The above examples also illustrate that the use of a decabromobiphenyl ether component in combination with the antimony oxide gives improved UL-94 ratings.

Other monomers may be interpolymerized with the monovinylidene aromatic monomers and the ethylenically unsaturated nitriles of the rigid phase already described. The vinylidene aromatic and ethylenically unsaturated monomers can be replaced by such other monomers e.g., 1 to 25% by weight, consistent with maintaining the properties of the polyblend as already described. Exemplary of such other monomers are conjugated 1,3 dienes, e.g., butadiene, isoprene, etc.; alpha- or beta-unsaturated monobasic acids or derivatives thereof, e.g., acrylic acid, methyl acrylate, ethyl acrylate, butyl acrylate, 2-ethylhexyl acrylate, methacrylic acid and the corresponding esters thereof; acrylamide, methacrylamide, vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. The above described other monomers may also be interpolymerized with the chloroprene of the rubber phase either as comonomers or grafted monomers on the polychloroprene rubber.

From the foregoing it should be apparent that many modifications and changes are possible in the present invention without departing from the spirit and scope of this invention.

What is claimed is:

1. A polyblend composition comprising:
   A. a polymer of a monovinylidene aromatic monomer and an ethylenically unsaturated nitrile monomer wherein the weight ratio of monovinylidene aromatic monomer to nitrile monomer is in the range of 80/20 to 20/80;
   B. from 16.5 to 80% by weight based on the total weight of the polyblend, of a grafted, crosslinked polychloroprene rubber having a Mooney viscosity of at least 200 (MS 2-½ min. 212° F.), said rubber being grafted with:
      1. at least one monovinylidene aromatic monomer, and
      2. an ethylenically unsaturated nitrile monomer; wherein the weight ratio of monovinylidene aromatic monomer to nitrile monomer in the grafted rubber is in the range of 80/20 to 20/80;
   wherein the amount of polychloroprene rubber in the polyblend, calculated as ungrafted rubber, is in the range of from 15 to 40% by weight, based on the total weight of the polyblend and wherein the particle size of the polychloroprene rubber prior to grafting is in the range of from 0.05 to 0.20 micron;
   C. from 0.5 to 5% by weight, based on the total weight of the polyblend, of a butadiene rubber having a particle size in the range of from 0.07 to 4.0 microns, said butadiene rubber having been grafted with:
      1. at least one monovinylidene aromatic monomer, and
      2. an ethylenically unsaturated nitrile monomer; wherein the weight ratio of monovinylidene aromatic monomer to nitrile monomer in the grafted rubber is in the range of 80/20 to 20/80; and
   D. from 6 to 12% by weight, based on the total weight of the polyblend of $Sb_2O_3$.

2. A polyblend composition as in claim 1 wherein the nitrile monomer is selected from the group consisting of acrylonitrile, methacrylonitrile and mixtures thereof.

3. A polyblend composition of claim 1 wherein the aromatic monomer is selected from the group consisting of styrene, alpha-methyl styrene, chlorostyrene, bromostyrene and mixtures thereof.

4. A polyblend composition as in claim 1 wherein the amount of grafted butadiene rubber is in the range of from 1 to 3% by weight.

5. An article of manufacture comprising an object formed from a polyblend composition comprising:
   A. a polymer of a monovinylidene aromatic monomer and an ethylenically unsaturated nitrile monomer wherein the weight ratio of monovinylidene aromatic monomer to nitrile monomer is in the range of 80/20 to 20/80;
   B. from 16.5 to 80% by weight based on the total weight of the polyblend, of a grafted, crosslinked polychloroprene rubber having a Mooney viscosity of at least 200 (MS 2-½ min. 212° F.), said rubber being grafted with:
      1. at least one monovinylidene aromatic monomer, and
      2. an ethylenically unsaturated nitrile monomer; wherein the weight ratio of monovinylidene aromatic monomer to nitrile monomer in the grafted rubber is in the range of 80/20 to 20/80;
   wherein the amount of polychloroprene rubber in the polyblend, calculated as ungrafted rubber, is in the range of from 15 to 40% by weight, based on the total weight of the polyblend and wherein the particle size of the polychloroprene rubber prior to grafting is in the range of from 0.05 to 0.20 micron;
   C. from 0.5 to 5% by weight, based on the total weight of the polyblend, of a butadiene rubber having a particle size in the range of from 0.7 to 4.0 microns, said butadiene rubber having been grafted with:
      1. at least one monovinylidene aromatic monomer, and
      2. an ethylenically unsaturated nitrile monomer; wherein the weight ratio of monovinylidene aromatic monomer to nitrile monomer in the grafted rubber is in the range of 80/20 to 20/80; and
   D. from 6 to 12% by weight, based on the total weight of the polyblend of $Sb_2O_3$.

6. An article as in claim 5 wherein the nitrile monomer is selected from the group consisting of acrylonitrile, methacrylonitrile and mixtures thereof.

7. An article as in claim 5 wherein the aromatic monomer is selected from the group consisting of styrene, alphamethyl styrene, chlorostyrene, bromostyrene and mixtures thereof.

8. An article as in claim 5 wherein the amount of grafted butadiene rubber is in the range of from 1 to 3% by weight.

* * * * *